United States Patent [19]

Limpaecher

[11] 4,233,537
[45] * Nov. 11, 1980

[54] MULTICUSP PLASMA CONTAINMENT APPARATUS

[76] Inventor: Rudolf Limpaecher, 45 Parsonage La., Topsfield, Mass. 01983

[*] Notice: The portion of the term of this patent subsequent to Aug. 11, 1994, has been disclaimed.

[21] Appl. No.: 290,076

[22] Filed: Sep. 18, 1972

[51] Int. Cl.² ............................................. H01J 17/26
[52] U.S. Cl. .................................... 313/231.3; 176/3; 176/5; 313/161
[58] Field of Search .................... 313/231.3, 231, 161; 176/3, 5

[56] References Cited

U.S. PATENT DOCUMENTS

| | | |
|---|---|---|
| 3,036,963 | 5/1962 | Christofilos .................... 313/161 X |
| 3,071,525 | 1/1963 | Christofilos .................... 313/161 X |
| 3,664,921 | 5/1972 | Christofilos .................... 176/5 X |
| 3,668,067 | 6/1972 | Christofilos .................... 176/5 |

*Primary Examiner*—Rudolph V. Rolinec
*Assistant Examiner*—Darwin R. Hostetter

[57] ABSTRACT

It has been discovered that plasma containment by a chamber having multi-pole magnetic cusp reflecting walls in combination with electronic injection for electrostatic containment provides the means for generating magnetic field free quiescent plasmas for practical application in ion-pumps, electronic switches, and the like. 1250 "Alnico V" magnets $\frac{1}{2}'' \times \frac{1}{2}'' \times 1\frac{1}{2}''$ provide containment in one embodiment. Electromagnets embodying toroidal funneling extend the principle to fusion apparatus.

16 Claims, 7 Drawing Figures

MULTICUSP PLASMA CONTAINMENT APPARATUS

This invention relates to vacuum systems, and more particularly to the containment of plasma within a vacuum system, and to a high-speed ion pump, means for generating a strong ion beam and other applications described herein.

In my papers with Professor K. R. MacKenzie (Ref 1) "Magnetic Multipole Confinement of a Magnetic Field-Free Plasma" *Proceedings of the 3rd International Conference on Quiescent Plasmas*, Elsinore, Denmark, September 20-24; (1971 p. 22 ff.) (Ref 2) "Magnetic Multipole Confinement of a Magnetic Field-Free Uniform Quiescent Plasma" *Bulletin of the American Physical Society*, (November 1971 p 1222) and in (Ref 3) my Ph.D. dissertation for the University of California, Los Angeles, "Parallel Magnetic Multipole Confinement of a Magnetic Field Free Plasma" Department of Physics March 1972, we have described results of a new electrostatic plasma containment scheme. In the tested devices, the walls of the plasma vacuum chamber were lined with rows of permanent magnet bars alternately oriented to provide a mirror cusp field which decreases exponentially electrical energy. The control of the electrical conductivity and temperature of such a contained high density and heated plasma is also useable for such applications of controlling and enhance the chemical reactions of atoms and molecules for the purpose of manufacturing chemical compounds and obtaining coherent and noncoherent electromagnetic radiation. By replacing the permanent magnets by electromagnets as well as using an external electron source for the plasma containment, it is also the object of the present invention to provide means for containing plasma for fusion reaction in a closed and hydromagnetically stable magnetic field configuration.

The electrostatic containment principle of plasma with injection of electrons in a multipole cusp device, has not been investigated heretofore either theoretically or experimentally. However, magnetic-field free plasmas with and without magnetic cusp containment have been studied.

Theoretical and experimental investigations have encountered the fact that the presence of metallic or dielectric boundaries and the consequent electrostatic sheaths, increase the plasma loss at a rate proportional to the ion acoustic velocity, tending to reduce the uniformity, plasma production, and density of the plasma.

In the steady state, without electron injection into the plasma, the number of positive charges carried to the walls by ions must equal the number of negative charges carried to the walls by electrons:

$$I_e = I_i \qquad (1)$$

Since the ions are at least 1800 times heavier than an electron the velocity of the electrons is much greater, so that the plasma quickly becomes sufficiently deficient in electrons to acquire a high positive potential so that ions are pushed out in greater numbers, and electrons are held back in sufficient numbers that equation (1) is satisfied.

The resulting plasma potential $V_p$ (volts) is given by $$V_p = (KT_e/4e)\ln(m_i/m_e) \qquad (2)$$

where it is assumed the electron temperature $T_e$ is much less than the ion temperature $T_i$; e is the electron charge, which in the mks system is $1.6 \times 10^{-19}$ coulombs; K is the Boltzmann constant, $1.381 \times 1s^{-23}$ joules/degree Kelvin; $m_i$ is the ion mass, $m_e$ is the electron mass.

For multipole cusp devices, without the forced electrostatic containment, condition described by equation (1) is still approximately valid, however, first order calculations show (page 83 ref 3) that for the new condition the flux to the multipole wall is mass independent and is proportional to the temperature of the specie in question. Since, however, the electron temperature for most plasmas is larger than the ion temperature, the electron flux is still larger; and a smaller electrostatic sheath with a still positive plasma potential is obtained. However, a reduction of the ion less rate is attained by the use of multipole cusped devices, since the effective wall area is reduced to about $Nr_L^2$ where N is the total number of cusps (assumed here circular) and where:

$$r_L = m_i|\overline{v}_i \times \overline{B}_o|/|e|B_o^2 \qquad (3)$$

$r_L$ is the Larmor radius, $\overline{v}_i$ is the vector velocity of an ion, e is the charge of the ion (usually the electronic charge) and $B_o$ is the magnetic field strength at the pole piece in webers/meter².

The condition for electrostatic ion containment in the multi-cusp device is brought about by the injection of electrons with a total current $I_{ee}$. The conservation of charge, then requires:

$$I_e - I_i = I_{ee} \qquad (4)$$

With sufficient injection of electrons, the resulting plasma potential is not positive, as in the case of equations (1) and (2) but becomes negative, thereby tending to hold back positive ion current, and containing the positive ions.

For a system, where the injected electrons also produce the plasma, the increase in the plasma density is due in part to the increase of the plasma production, since the emission electrons are being partially contained by the multipole structure. However, the dominating effect is the increase of the ion lifetime due to the electrostatic containment. In the experimental system tested, a plasma potential as negative as much as $-7$ volts (page 56 of ref 3) has been obtained. With such a negative plasma potential and an ion temperature of about 0.6 ev, only a small proportion of the more energeticions escape to the wall.

To compare theory and experimental performance three systems were constructed by the inventor.

Two identical one-liter systems, one with electrostatically forced positive ion containment and one with nonmagnetic walls, were constructed and tested. The direct comparison shows (dissertation p. 40) a performance improvement in the electrostatic multipole device of better than a factor of 100. On page 42 of ref 3 an improvement of over three orders of magnitude is obtained in the newer 86 liter device. The total improvement is due to the improvement of the plasma production and reduction of plasma loss to the walls.

The experimental plasma lifetime in the electrostatically forced multimagnetic device (page 58 of ref 3) is compared with the plasma lifetime of the same multimagnetic device without electrostatically containment (page 62 of ref 3 under Afterglow time). A plasma lifetime increase as much as 80 has been measured in the electrostatically containment device.

Prior Art

Many discharge plasma sources without magnetic fields have been constructed. One of the more recent systems have been reported by Taylor UCLA Plasma Physics Report P. 70 and by Hoog and Schott, (cited in ref 3).

Taylor at the UCLA Plasma Physics Group has produced plasmas improved in quiescence and uniformity by installing numerous electron-emitting filaments around the periphery of the vacuum chamber, and restricting the emission rate to 100 milliamperes (ma) per centimeter (cm) of filament length. Hoog and Schott report a similar approach in Rev. Sci. Inst. 41,1340 (September 1940).

Magnetic plasma containment by electromagnets with an alternate north and south pole is covered by Harold P. Furth in U.S. Pat. No. 3,369,140, Feb. 13, 1968. Sadowski in Rev. Sci.

The magnetic containment with multipole cusp devices of nonfusion plasma, using permanent magnets has been applied in ion thrusters as disclosed in Electro-Optical Systems Inc. Report 7240 on NASA contract NAS7-587 and by W. Knauer in AIAA Paper No. 70-177 AIAA 8th. Aerospace Sciences Meeting, New York, N.Y., Jan. 19–21 1970 "Power Efficiency Limits of Kaufman Thruster Discharges". The forced electrostatic containment of plasma in a multipole system has not been investigated either theoretically or experimentally prior to my thesis research.

I have found that small, commercially available permanent magnets have sufficient strength for use in a magnetic multipole structure for the forced electrostatic plasma containment of nonfusion plasma, to increase the plasma lifetime and thereby reduce the ionizing requirements by one to three orders of magnitude compared with a system without the magnets.

The effectiveness is such that an ion source as described may be employed to provide an improved ion pump; and an improved electrodless discharge device.

I have extended the principles of containment to the case of a fusion plasma. Requiring higher magnetic fields, electromagnets are employed, and the loss of ions at the pole faces of the permanent magnets is reduced by permitting them to pass through the open core of the electromagnets to reemerge at the opposite pole.

Other objects and features of my invention and of these embodiments thereof will be better understood from the following specification taken in conjunction with the annexed drawings of which:

Figure 1:
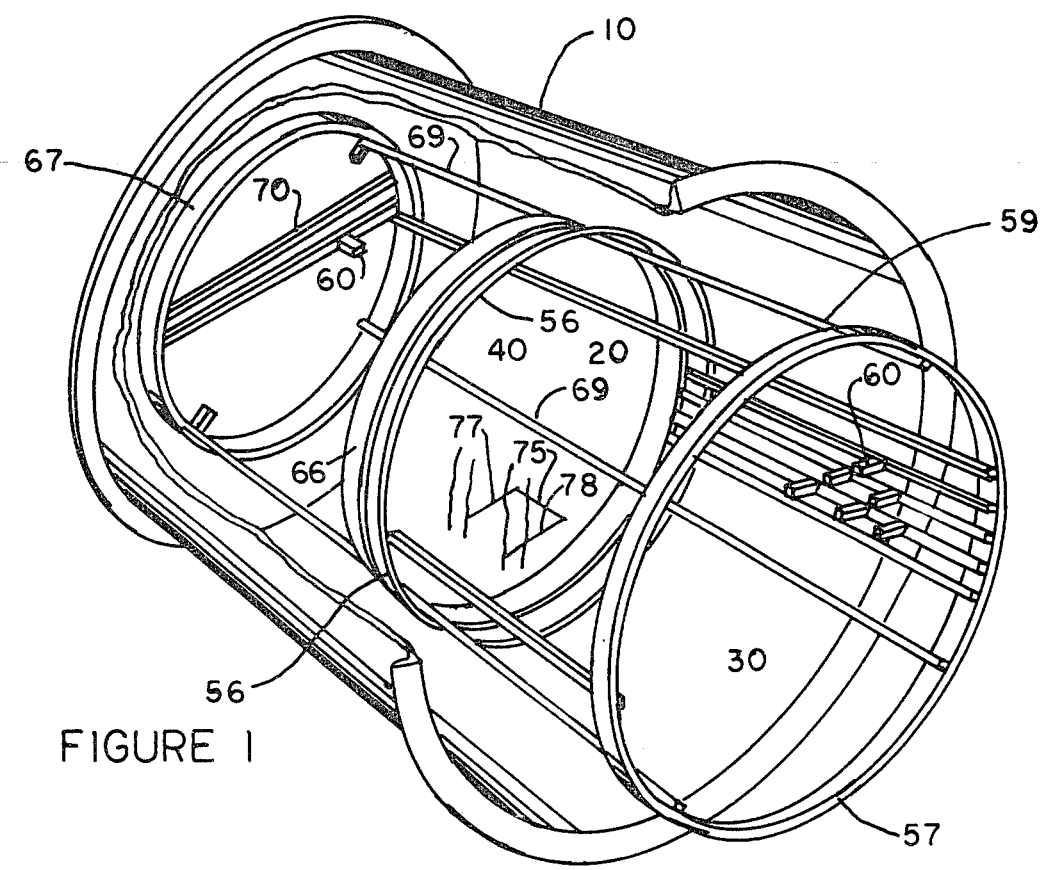
FIG. 1 is a representation of a vacuum system employing a plasma chamber in accord with the invention.

FIG. 1 is a representation of a vacuum system employing the novel laboratory plasma source. It is the 86 liter system, conceived, constructed, and tested by the inventor for such a purpose. A vacuum container 10 contains within it a plasma chamber 20 made up of a first section 30 and a second section 40 separated by insulators (not shown). The first section comprises a base ring 56 and an end ring 57 connected by a plurality of connecting square rods 59, to each of the rods 59, magnets 60 adhere arranged in alternately opposite polarity as indicated. Similarly the second section comprises a base ring 66, and end ring 67, and connecting rods 69. The ends of the chamber is closed by a plurality of parallel rods 70, likewise carrying a reflecting array of magnets 60. Centrally in each section, a number of tungsten filaments 75 are supported on leads 77, 78. The leads pass between the connecting rods and between like polarity magnets. The electrically heated filaments are biased negative with respect to the multipole structure to emit electrons for the plasma production and plasma containment. The center cusp region of the polished and nickel-plated magnetic pole faces serve as the anode for the discharge and also establishes the plasma potential for the system. Alternately, a separate anode placed in front of all of the magnets may be advantageous for some applications.

An effective pole should be at least several times the Larmor radius wide to provide a good anode and a good potential reference for the plasma, but should not be too large.

Given the pole size and the magnet material, the magnet length L is that which will be required to gain the desired field strength.

For a magnetic field-free plasma of given volume, the plasma loss rate is proportional to the number of magnetic poles and the square of the Larmor radius. Increasing the pole size and therefore the pole spacing will increase the magnetic field penetration and therefore the volume of the contained plasma. The magnetic pole size, shape, and length depends also on the magnetic property of the magnet material. The numerical solution of the magnetic field is a standard procedure of magnetic circuit design.

Figure 2:
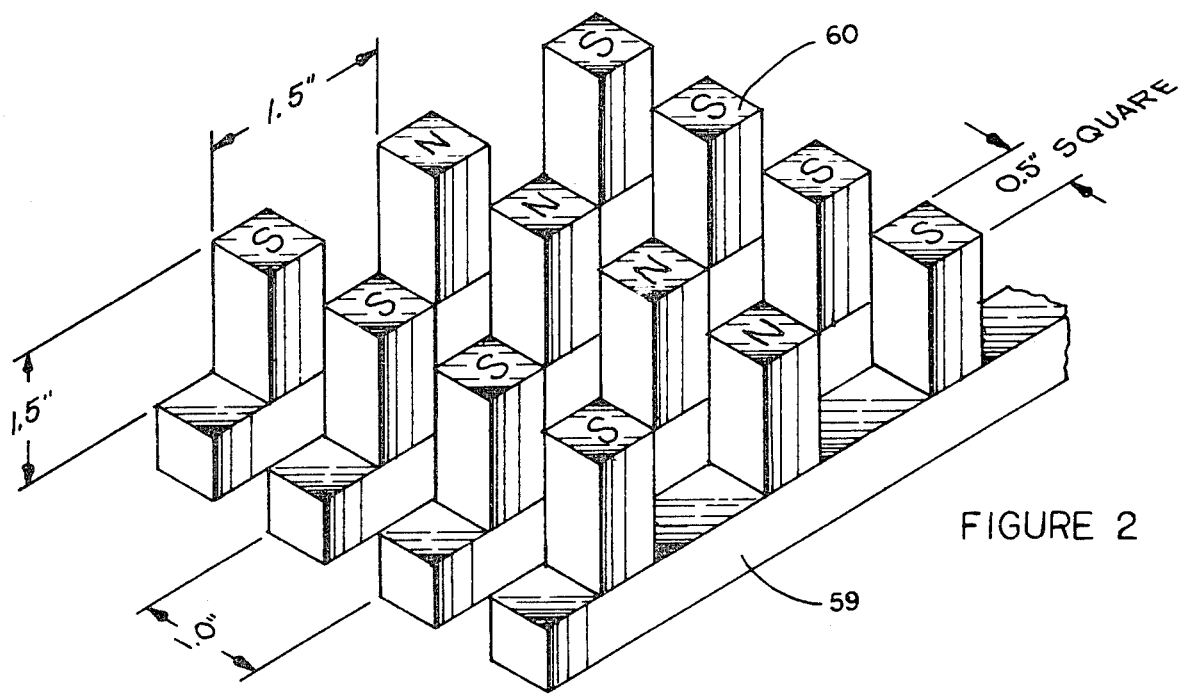
FIG. 2 is a detail of a portion of the magnetic wall of the chamber of FIG. 1.

For the 86 liter system tested, a broken line cusp geometry was selected, consisting of rows of like poles as illustrated by FIG. 2. Only the polarity from one row to the next is alternating. The complete wall surface was aligned with a total of 1252 "Alnico V" magnets with a pole face of $\frac{1}{2}"/\frac{1}{2}"$ and a length of 1.5". A center to center pole spacing of 1" between poles of like polarity and a center to center spacing of 1.5" between poles of opposite polarity was selected (ref 3 page 19). Increasing the spacing between the poles of opposite polarity increased the plasma density but also reduced the contained plasma volume. The trade-off can be weighted to favor one of these factors at the expense of the other.

It will be recognized that there are many configurations that will result in the cusped field configuration required for confinement. Three configurations have been tested by the inventor. I prefer the rectangular array because of its symmetry and simplicity. A hexagonal array is possible in which poles of one sense, say "North" are each surrounded by a hexagonal fence comprising the matching "South" pole which is shared with the six neighboring "North" poles.

Although practical results have been obtained with the simple square pole shown, an improvement, however, can be obtained by reshaping and reducing the pole faces of the magnets.

With this system, most gases, including the vapors of solids and liquids, can be ionized and contained effectively within the volume of the multipole structure with a minimum expenditure of energy.

Ion Pump, Ion Beam Source, and Ion Engines

Figure 3:
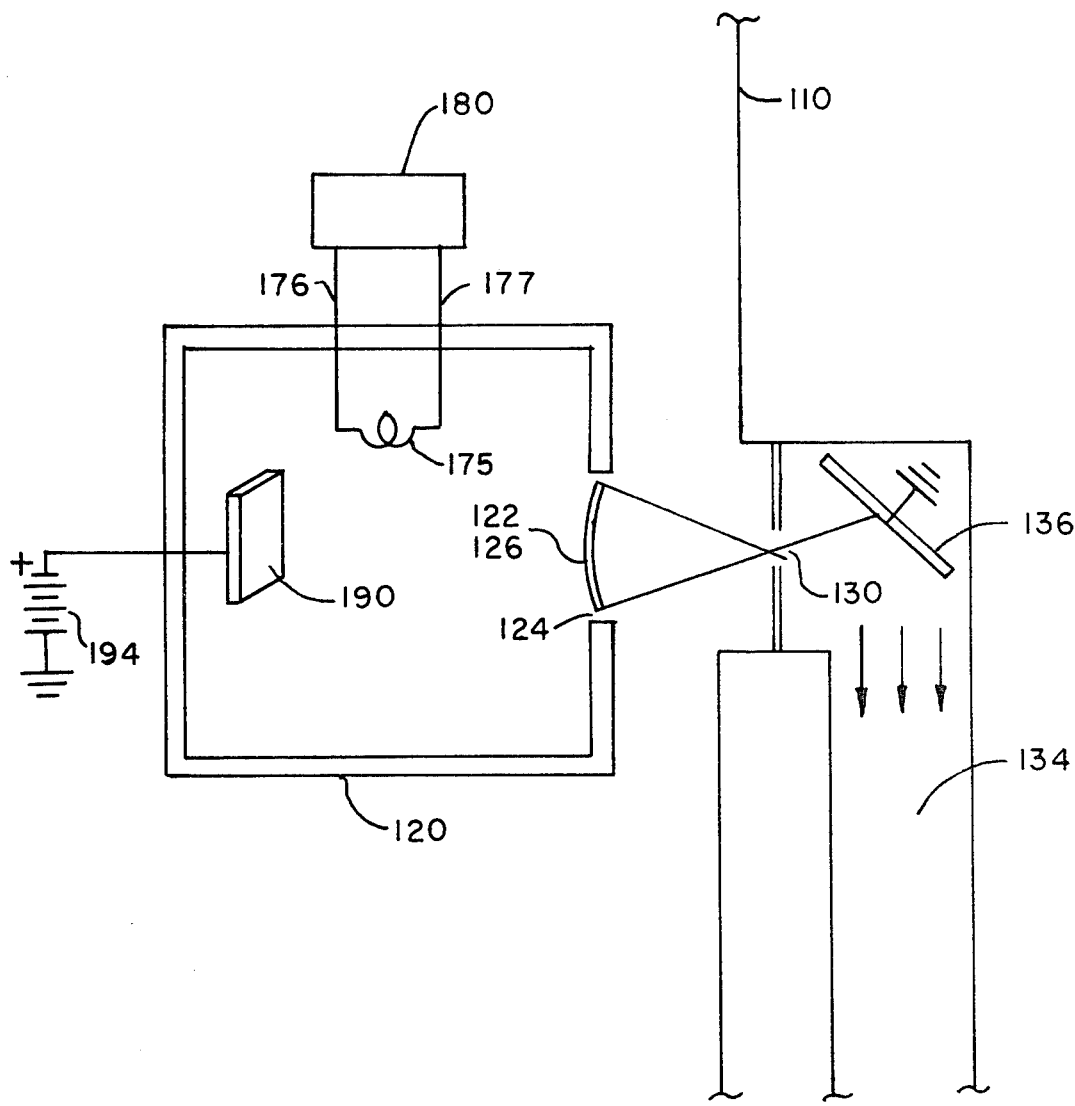
FIG. 3 is a representation of a vacuum system employing the vacuum pump of the invention.

FIG. 3 is a representation of a vacuum system employing the novel ion pump of the invention. A vacuum container with a wall 110 contains a plasma chamber 120 of the type of chamber 20 of FIG. 1, cylindrical in form with an exit port 124 and an electrostatic or magnetic lens 126 such as the screen 122. Within the chamber 120 are a number of tungsten filaments 175 supported from without by leads 176, 177 and fed with electric power from the power supply 180. The walls of the chambers are constructed as shown in FIG. 1 with the permanent magnetic mirror structure. This structure permits a neutral gas to enter to be ionized by the emission electrons. The ionized gas within the magnetic mirror structure can be extracted from the vacuum chamber. The curved screen 126 with a negative potential greater than the emission potential, draws ionized particles out of the chamber and serves as a simple illustrative way to direct them through the iris 130 into the outlet pipe 134. A grounding plate 136 relieves the ions of their charge and deflects them toward the fore pump (not shown) or a second stage of an ion pump. Alternatively, the ions may be withdrawn by condensing them on a negatively-biased circulating pool of mercury.

The pump requires that the mean-free-path of the ions shall be long enough to reach the outlet pump; but this amount of vacuum may be readily achieved with available mechanical pumps.

The emerging charged particles will tend to bounce against and carry along neutral molecules, assisting thereby in increasing the pumping.

To further assist in pumping, a titanium electrode 190 within the plasma chamber is bombarded with electrons when positively biased from a source 194 to evaporate and condense titanium for better pumping.

For a system of the size of the 86 liter system, experimental data as well as calculation, show this device could be used in conjunction with an electrostatic lens to obtain a pumping speed of 20 liters/sec and 160 liters/sec for helium and argon per ampere of emission current. Since this system, with cooled multipole structure, can be operated with more than 100 amperes, a pumping of 2,000 to 16,000 liters/sec can be obtained for all gases.

With a redesign of the ion extractor to an ion accelerator, the system may be used as an ion engine. This system may use hydrogen as the propellent for maximum thrust per unit mass utilization.

INDUCTION HEATING

For chemical processing, atomic excitation, molecular excitation and whenever heating is required energy may be pumped into a partially or fully ionized gas through induction heating of a multimagnetically contained plasma. This is accomplished by constructing the multimagnetic mirror container in a configuration such that the contained and ionized gas forms a one turn, shorted out, secondary of a transformer (s). One such configuration would be a plasma of the form of a donut. An alternating or pulsed signal applied to the primary of such a transformer will produce ohmic heating in the conductive plasma medium.

Figure 4:
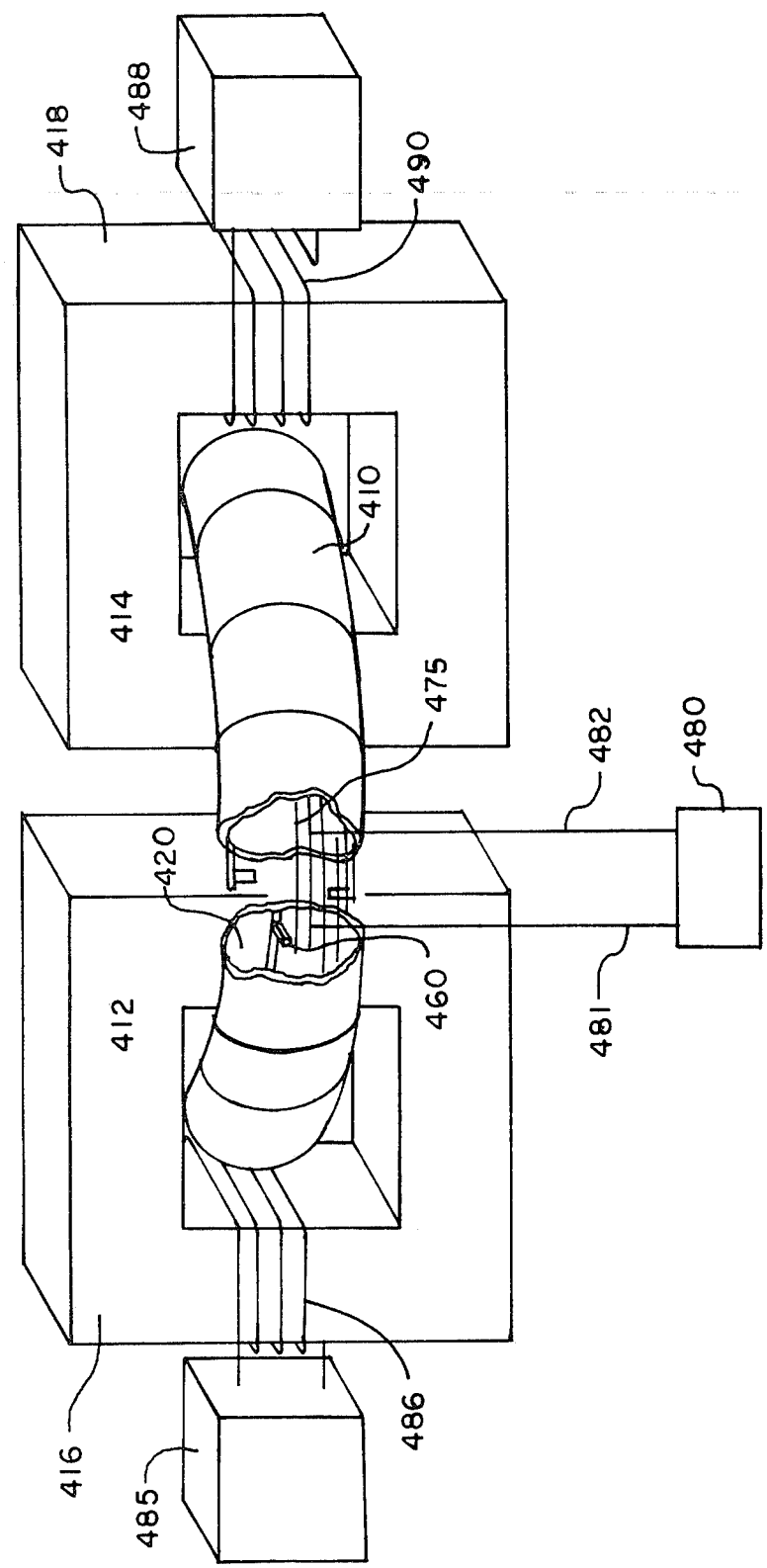
FIG. 4 illustrates a torroidal plasma chamber providing a controllable circuit for the transmission of alternating current power.

FIG. 4 illustrates a high-power electronic switch configuration. A hollow torroidal container 410 links legs 412 and 414 of two transformers 416 and 418 respectively. Within the container 410 is a torroidal plasma chamber 420 made up of a large number N of sections each of which may be substantially similar to the section 30 in FIG. 1 except that the base rings and end rings of each section are not parallel but lie in planes meeting with a dihedral angle of 360/N degrees.

Each of the chambers contain closely spaced permanent magnets 460 to form reflecting cylinder walls, and filaments 475 for ion injection. The filaments are connected to a bias and power supply 480 by leads 481, 482.

When the filaments are heated and biased negatively, a plasma is produced and maintained, but when the filaments are biased positively, the plasma is extinguished within a fraction of a millisecond. Since the electrical resistance of plasma is of the order of $10^{-3}$ ohm-centimeters, a torroidal chamber with a cross section of 1000 cm$^2$ and a circumference of 2 meters, would have a resistance of only about two milliohms. Alternating currents of many thousands of amperes may be induced to flow in the plasma with efficiency approaching metallic conductors, and without contact wear and with high switching speed.

Referring to FIG. 4, an input power source 485 is connected to a primary winding 486 of the transformer 416, an output load 488 is connected to the secondary winding 490 of transformer 418. When a plasma is sustained in the chamber, power flows from the source 485 to the load 490.

Sometimes the object is only to heat the plasma, to accelerate a chemical reaction, for example. An induction arrangement requiring only one transformer may be employed.

Of course the metal parts of the plasma container and plasma chamber, and the bias wiring must be arranged so as not to form closed loops of metallic conductors encircling a transformer leg, as is well known in the art.

CONTAINMENT OF FUSION PLASMA

Figure 5:
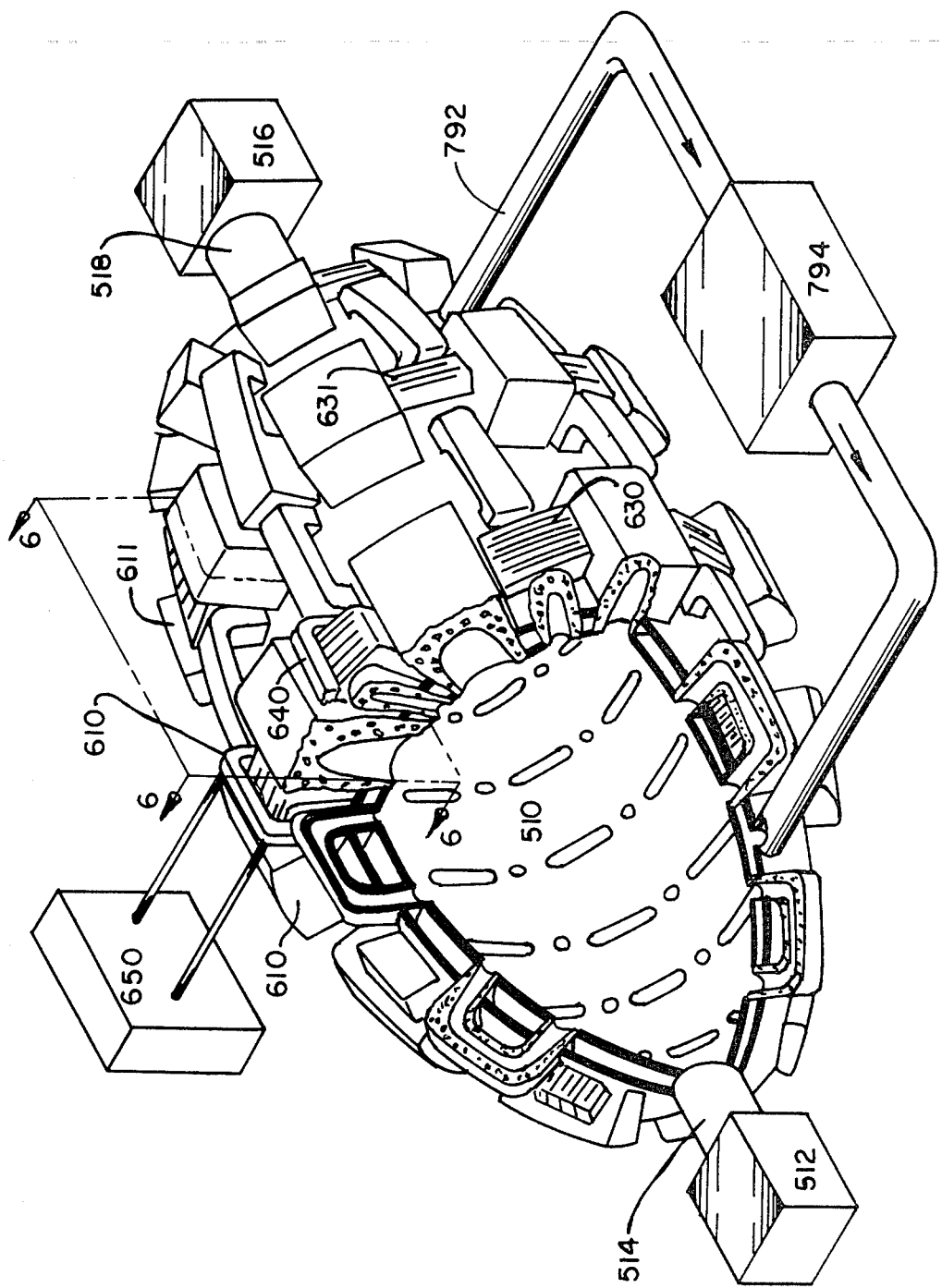
FIG. 5 is a diagram, partially cut away of a fusion machine in accord with the invention.

To contain high temperature high density plasma for fusion reactions, the magnetic field strength and pole face size has to be increased. This can be achieved by replacing the permanent magnets of the multipole system by electromagnets. The general arrangement of a fusion machine constructed in accordance with the invention is shown in FIG. 5. The machine comprises a generally elipsoidal chamber 510 of generous proportions. At one end, an electron gun 512 injects electrons into the chamber through the central core of a strong electromagnet 514 which provides a "North" pole at the end of the chamber. At the opposite end, an ion generator 516 admits ions into the chamber through the center of another strong electromagnet 518, which provides a pole at that end. Between these poles is arrayed a large number of "horse-shoe" electromagnets to provide the broken line-cusp array substantially as in the case of the permanent magnets.

I have found that the substantial containment achieved by the permanent-magnet arrays is still subject to unacceptable losses for a fusion machine. The losses in the permanent-magnetic arrangement are in large measure by way of collision with the pole faces. In the case of electromagnets it is possible to guide the ions through the open core of magnet to reemerge at an opposite pole. I call this "torroidal funneling".

I have also found that losses can be minimized by inserting weak auxiliary poles between the main poles.

Figure 6:
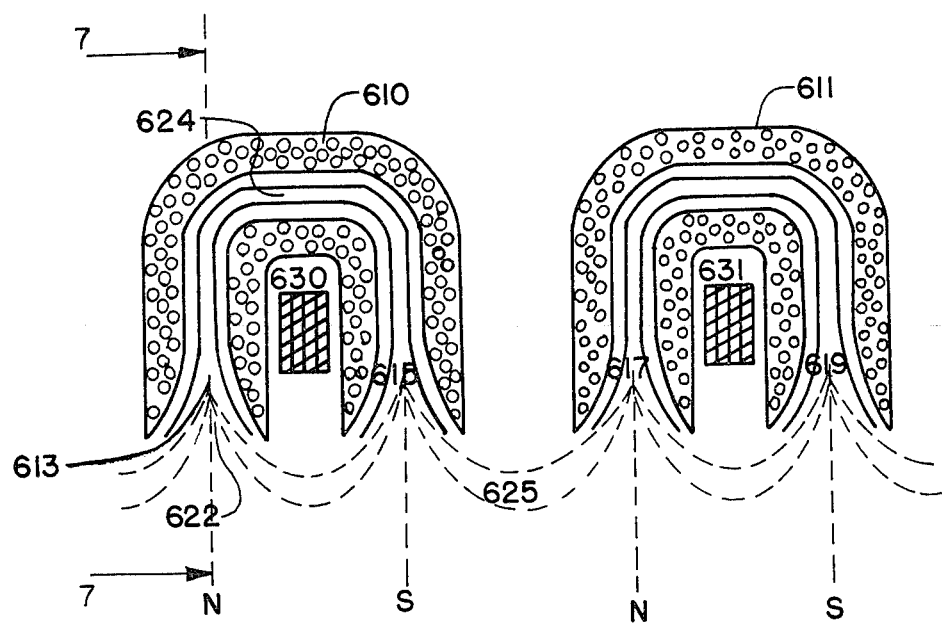
FIG. 6 is a detail of the machine of FIG. 5 showing the feature of torroidal funneling and induction heating.

The arrangement of these magnets may be better understood with relation to FIG. 6 which is a highly schematized sectional view of a portion of the machine of FIG. 5 taken along an axial section 6—6.

The electromagnets 610, 611 are arranged so that the north pole 613 of magnet 610 is one element of one broken-line cusp, the south pole 615 is an element of the next line cusp, the north pole 617 of the magnet 611 is part of the next line cusp, and the south pole 619 of the following line cusp, successively in the axial direction of the chamber.

The magnets comprise funnel portions 622 and torroidal portions 624, the funnel portions being flared to obtimize ion capture. The lines of force 625 flare generally as indicated.

Passing around the chamber are rings 630, 631 of laminated magnetic iron forming a closed magnetic circuit. It will be seen that plasma forms a closed loop around one of these cores at each magnet, the circuit being completed by the main body of plasma. Windings 640 (FIG. 5) also link the cores 630, 631. Power from a heating power supply 650 may be fed to these windings to induce heating of the plasma for the purpose of initiating fusion. Heat is also added by the electron gun 512 and when ions from the ion generator 516 are captured by the negatively charged plasma.

Figure 7:
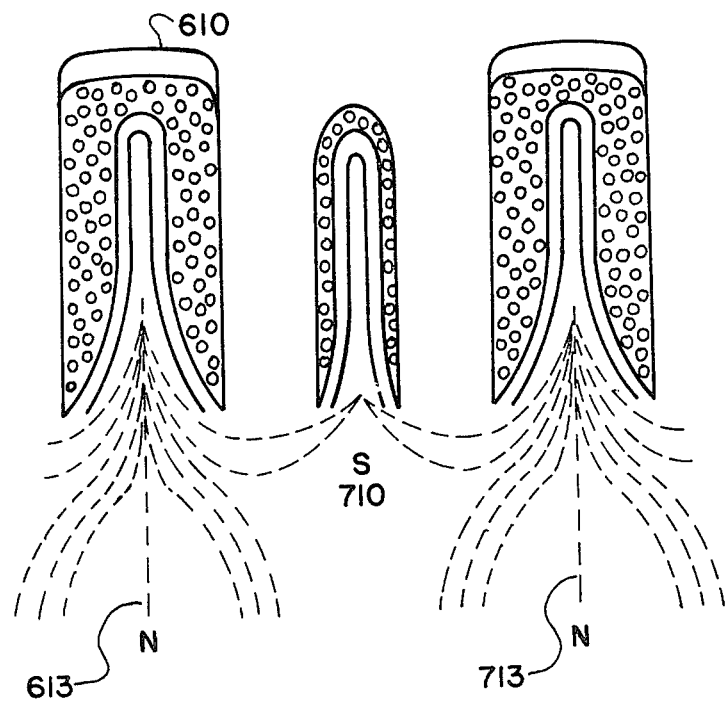
FIG. 7 is a detail of the machine of FIG. 5 illustrating the operation of auxilliary minor poles.

FIG. 7, also highly schematic, indicates the location of auxilliary weak poles 710 between main poles 613, 713.

The main poles are preferably of eliptical cross section of as much elipticity as the resulting mechanical stress can be made to tolerate in a practical structure. The presence of the auxilliary poles, which are weak enough to be negligible in the active volume of the plasma, serve to reduce the effect of low field regions which otherwise would be present between the main poles of like sense.

For clarity, the drawings omit many practical factors of great importance. It will be understood that the torroidal portions of the windings will include windings to introduce a helical field to be added to the torroidal to eliminate the so-called ExB drift.

Since this is contemplated as a steady-state machine, cryogenic superconducting magnets are preferred for the electromagnets. Effective thermal insulation, and efficient mechanical support are required for these.

A fusion reactor generates neutrons and heat. The neutrons are absorbed, reflected and converted to heat by a blanket of lithium and lithium hydride or the equivalent which must be fitted around the magnets. The magnetic materials, like all the materials exposed to the neutrons, must be selected for their nuclear properties, as well as their primary properties.

The entire container is permeated with piping to carry a working fluid, liquid sodium, a hydrocarbon, or pressured water, for example, which enters the reactor by a pipe 790 and leaves the reactor by a pipe 792 to carry heat to a using apparatus 794.

The embodiments of the invention in which an exclusive property or privilege is claimed are defined as follows:

1. Plasma containing apparatus comprising,
   (a) a container vacuum tight to maintain the plasma pressure,
   (b) a plasma chamber within said container,
   (c) said chamber having magnetic multipole ion reflecting walls made up of an array of at least thirty magnetic poles of alternating sign, and
   (d) means for injecting electrons into said chamber in sufficient quantity to maintain the resulting plasma at a substantial negative potential.
2. Plasma apparatus as defined by claim 1
   (e) wherein said walls are made up of parallel ferromagnetic rectangular bars to which adhere permanent magnetic poles.
3. Plasma apparatus as defined by claim 1
   (e) wherein said means comprises a heated tungsten filament.
4. Plasma apparatus as defined by claim 3
   (f) wherein said walls comprise a plurality of small permanent magnets.
5. Plasma apparatus as defined by claim 1,
   (e) wherein said walls comprise a plurality of small permanent magnets.
6. Plasma apparatus as defined by claim 5
   (f) wherein said magnets are arranged in a broken line-cusp array, each broken line-cusp being made up of a plurality of like-sense poles spaced apart by a predetermined distance, and said array comprising a plurality of parallel broken line cusps of alternately opposite sense, spaced apart by a second predetermined distance of the order of said first distance.
7. Plasma apparatus as defined by claim 5
   (f) wherein said magnets are arranged in a broken line-cusp array, in further combination with:
   (g) an exit port in said chamber, and
   (h) electrostatic lens means to direct ions from said chamber into an outlet pipe.
8. Plasma apparatus as defined by claim 1
   (e) wherein said chamber is in the form of a toroid, in further combination with
   (f) a closed core of magnetic material linking said toroid.
9. Plasma apparatus as defined by claim 1
   (e) wherein said poles are provided by horse-shoe electromagnets.
10. Plasma apparatus as defined by claim 9
    (f) wherein said magnets are arranged in a broken line-cusp array.
11. Plasma apparatus as defined by claim 9
    (f) wherein said magnets have hollow cores proportioned for torroidal funneling.
12. Plasma apparatus as defined by claim 11
    (g) wherein at least one of said magnets is linked by a closed magnetic core of magnetic material which links also wire windings by which said plasma may be heated by induction.
13. Plasma apparatus as defined by claim 9
    (f) wherein said means comprises an electron gun external to said chamber.
14. Plasma apparatus as defined by claim 13
    (g) wherein said electrons are carried from said gun to said chamber through the hollow core of an electromagnet.
15. Plasma apparatus as defined by claim 9 in further combination with
    (f) means for injecting ions into said chamber.
16. Plasma apparatus as defined by claim 15
    (g) wherein said last-named means comprises
    (h) an ion generator, and
    (i) a hollow electromagnet to guide said ions from said generator into said chamber.

* * * * *